United States Patent [19]
Shinada

[11] Patent Number: 5,970,029
[45] Date of Patent: Oct. 19, 1999

[54] OPTICAL DISK PLAYER CAPABLE OF PLAYING BACK A PLURALITY OF DIFFERENT TYPE OPTICAL DISKS

[75] Inventor: Akira Shinada, Kanagawa, Japan

[73] Assignee: Sony Corporation, Tokyo, Japan

[21] Appl. No.: 09/036,993

[22] Filed: Mar. 9, 1998

[30] Foreign Application Priority Data

Mar. 25, 1997 [JP] Japan .................................... 9-071399

[51] Int. Cl.$^6$ .............................. G11B 17/22; G11B 3/90
[52] U.S. Cl. ................................................. 369/33; 369/58
[58] Field of Search ................................. 369/33, 58, 32, 369/47, 48, 54

[56] References Cited

U.S. PATENT DOCUMENTS

| | | | |
|---|---|---|---|
| 5,289,451 | 2/1994 | Ashinuma et al. | 369/58 |
| 5,633,840 | 5/1997 | Han | 369/32 |
| 5,761,167 | 6/1998 | Kim et al. | 369/58 |
| 5,831,966 | 11/1998 | Taira et al. | 369/275.3 |

*Primary Examiner*—Tan Dinh
*Attorney, Agent, or Firm*—Frommer Lawrence & Haug, LLP.; William S. Frommer

[57] ABSTRACT

A disk playback apparatus provided by the present invention is capable of reproducing information from any one of a plurality of disk types including a truly single sided disk, a single sided disk, a double sided disk with TOCs (Tables of Contents) and a double sided disk with no TOC and capable of determining which surface of a disk mounted on the apparatus is the front surface of the disk so as to allow control of a playback operation to be carried out to always start the operation from the front surface of the disk without the need for the user to be aware of a disk surface orientation in which the disk is mounted thereon and to be aware of whether the mounted disk is single sided or double sided.

10 Claims, 13 Drawing Sheets

F I G. 4

| TYPE 1 : | TRULY SINGLE SIDED DISKS |
| TYPE 2 : | SINGLE SIDED DISKS |
| TYPE 3 : | DOUBLE SIDED DISKS (WITH TOCs) |
| TYPE 4 : | DOUBLE SIDED DISKS (WITH NO TOC) |

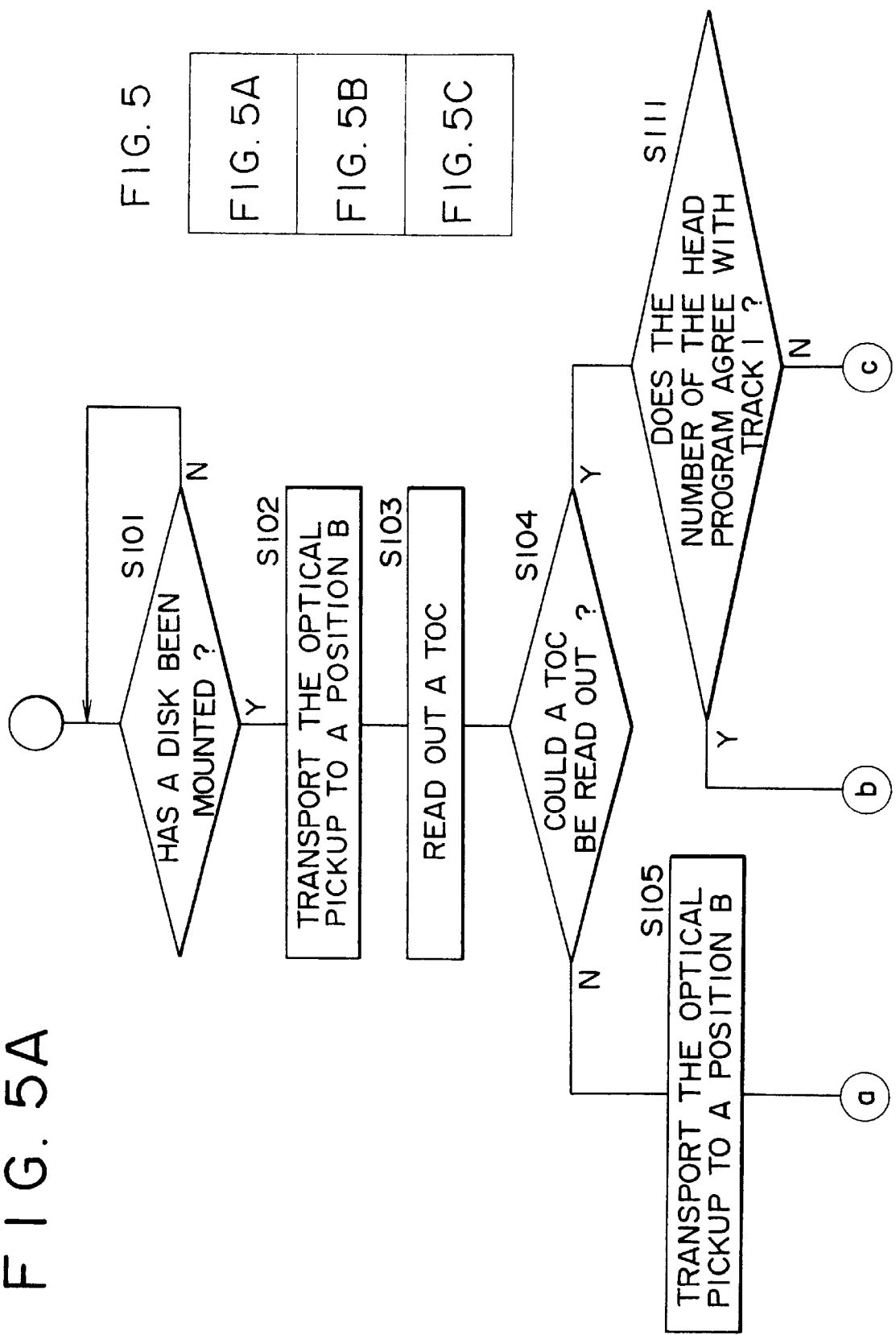

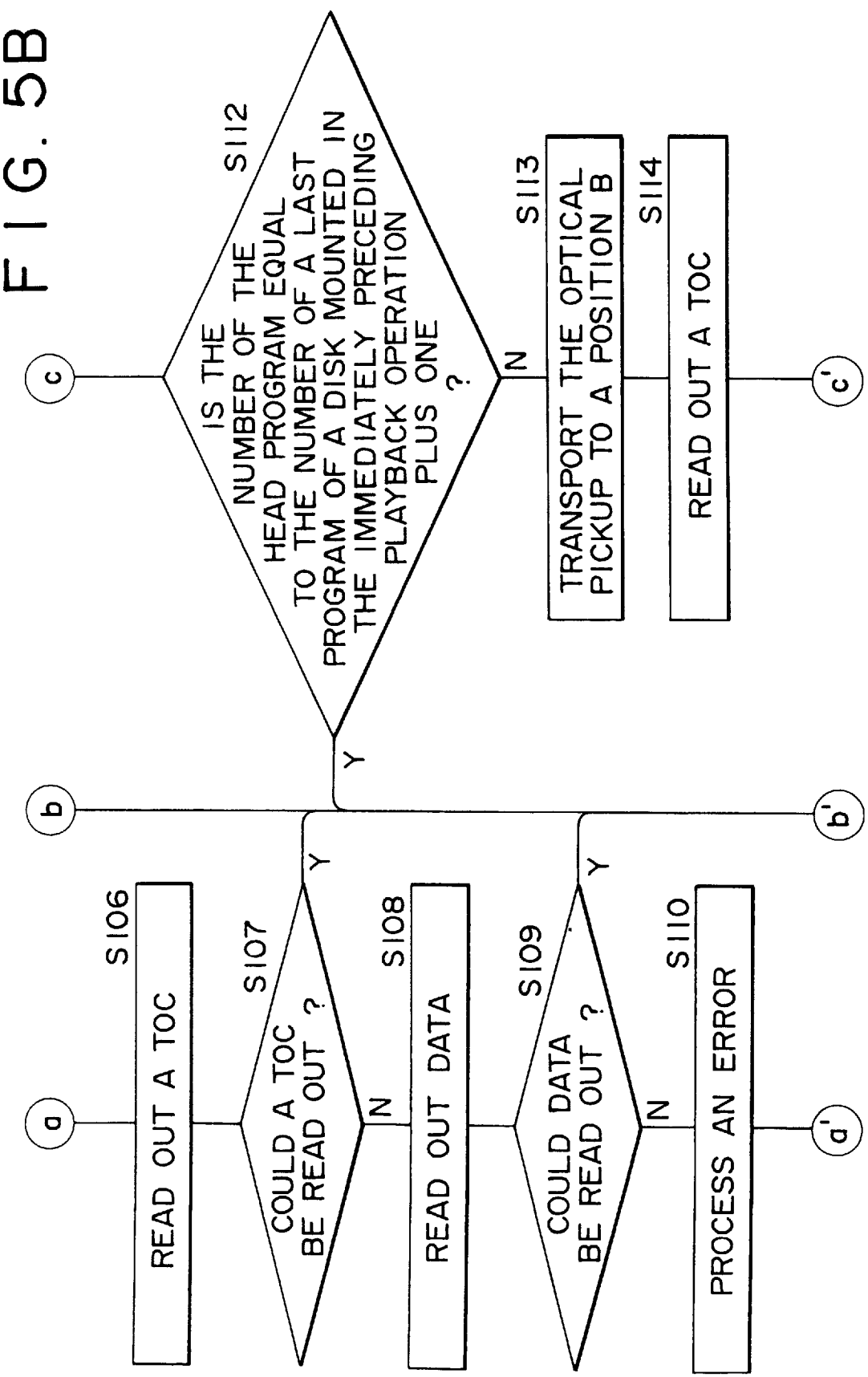

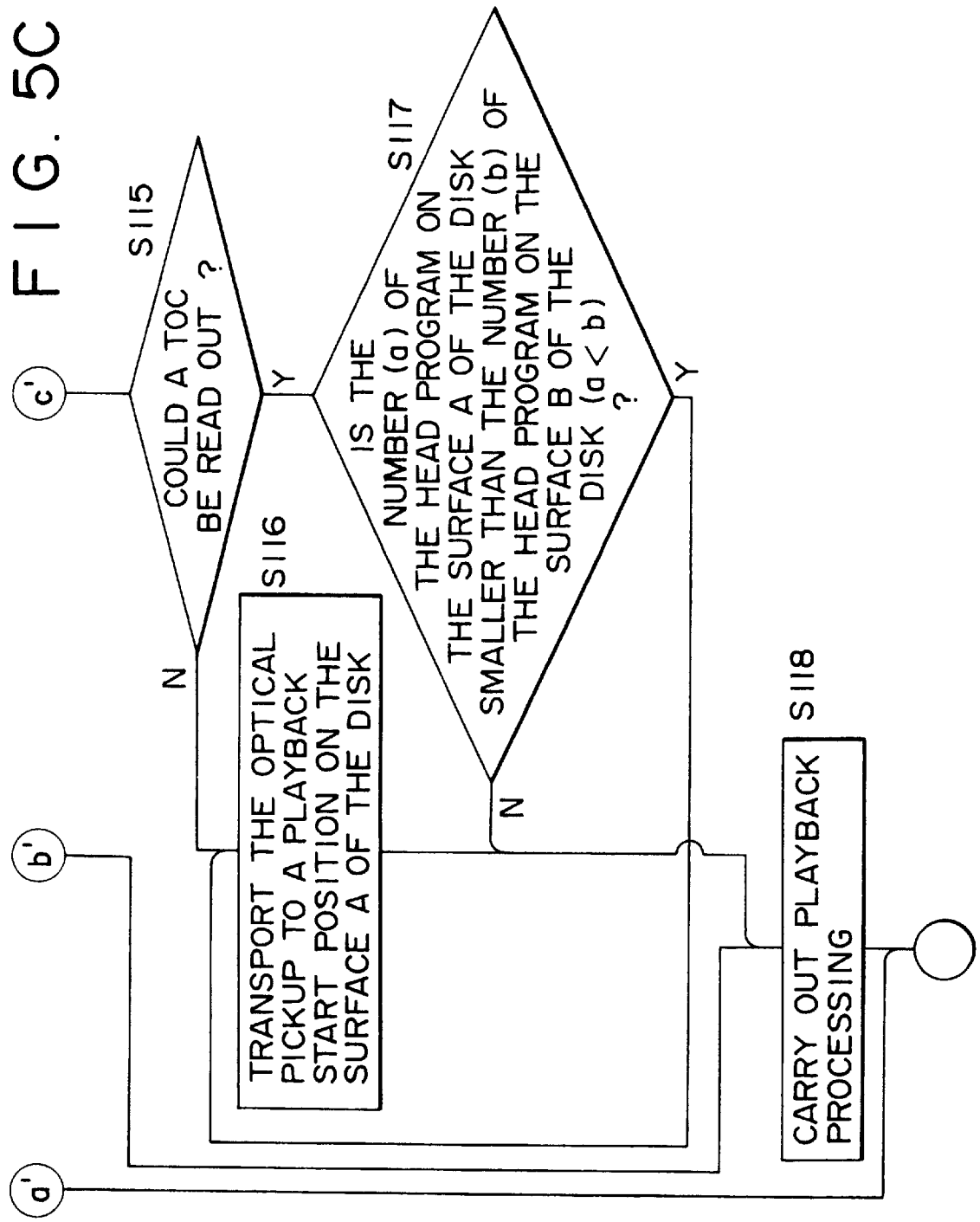

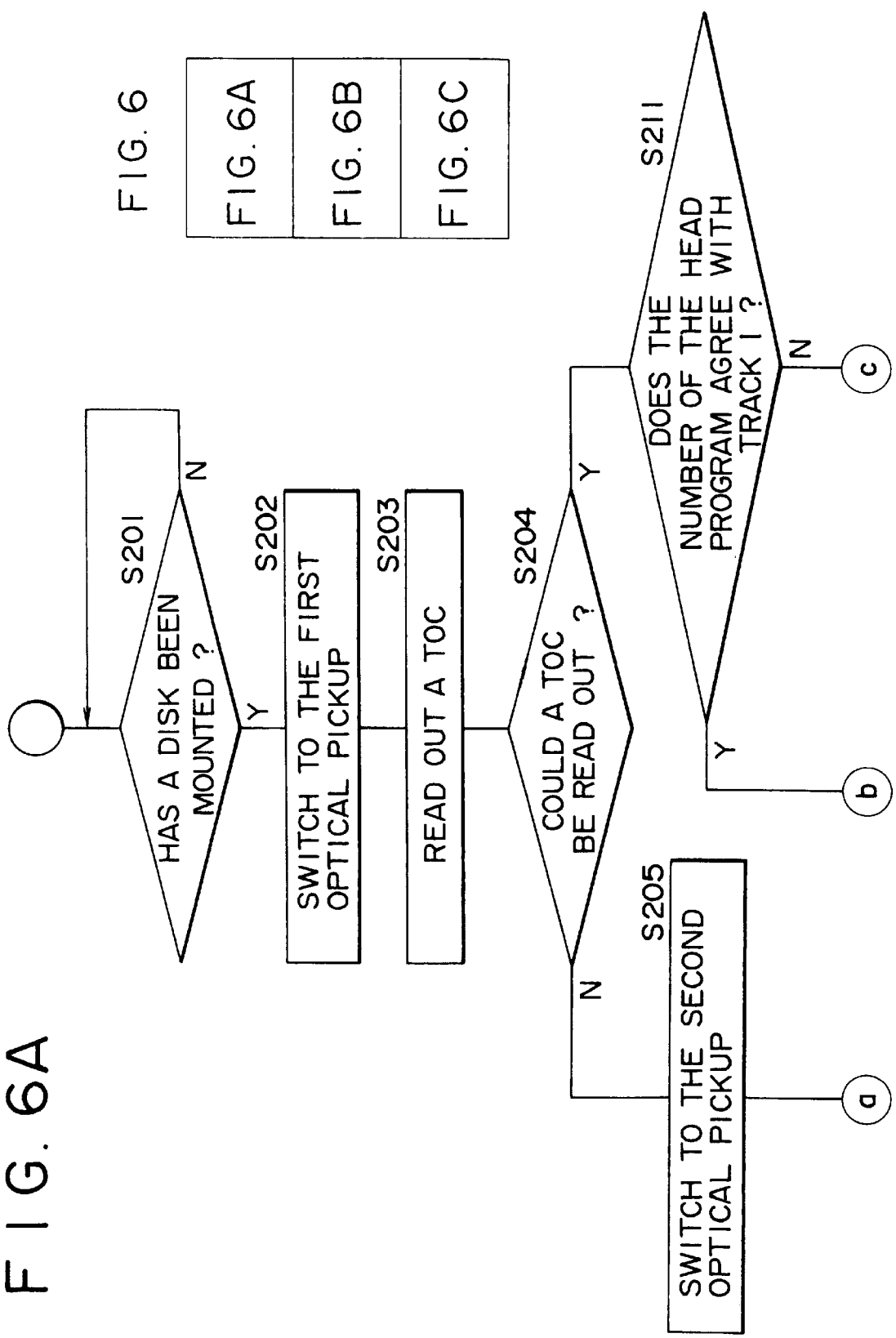

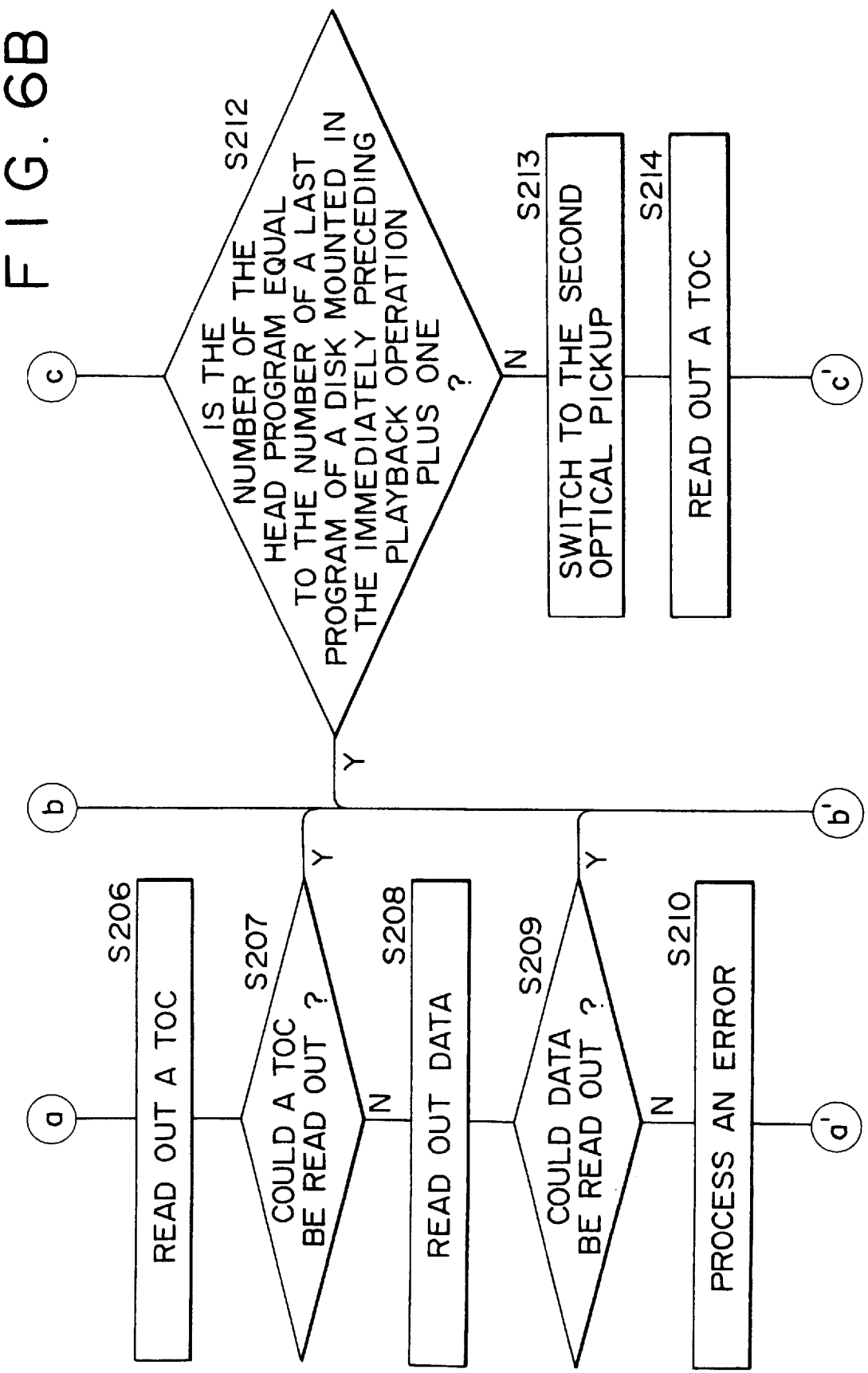

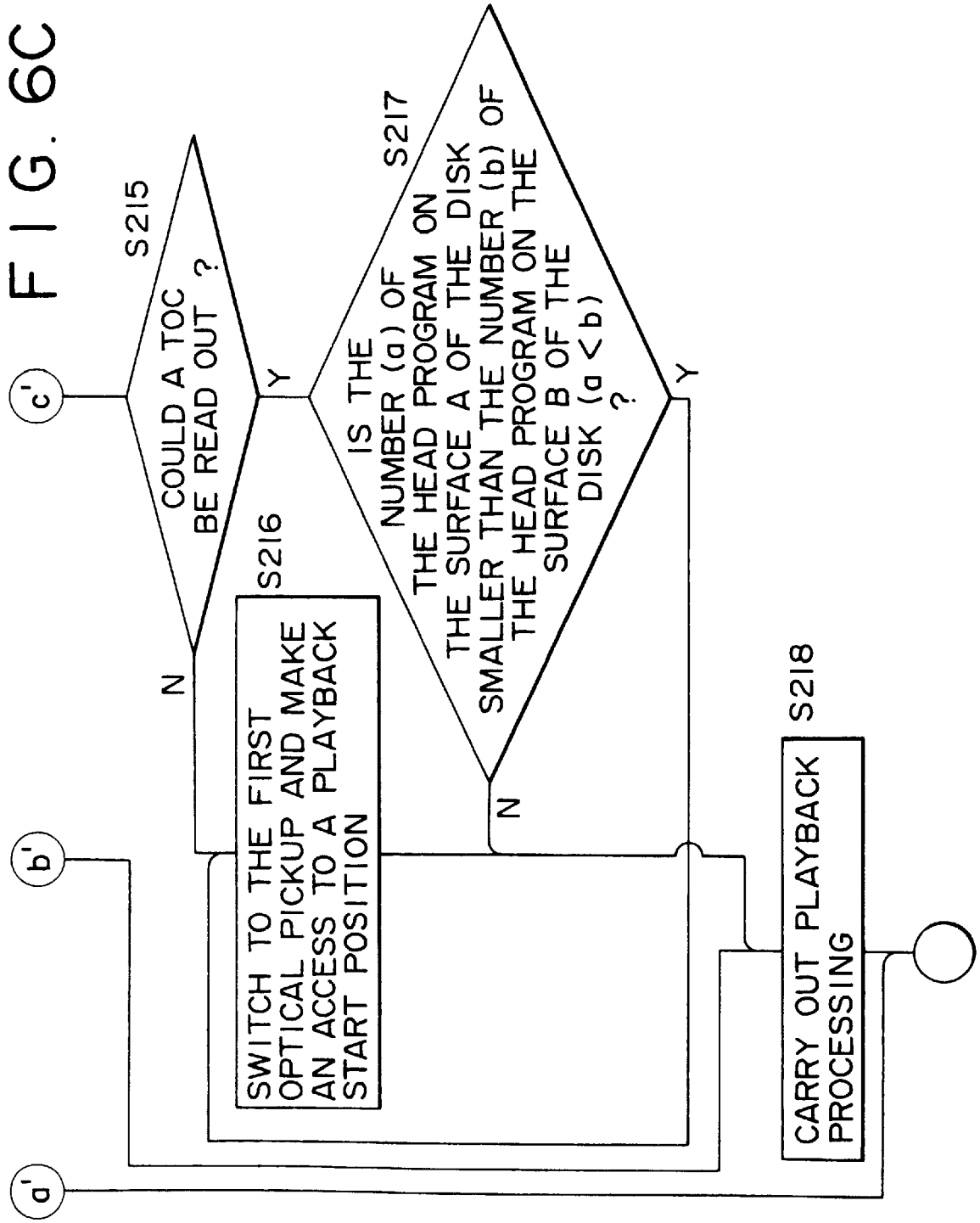

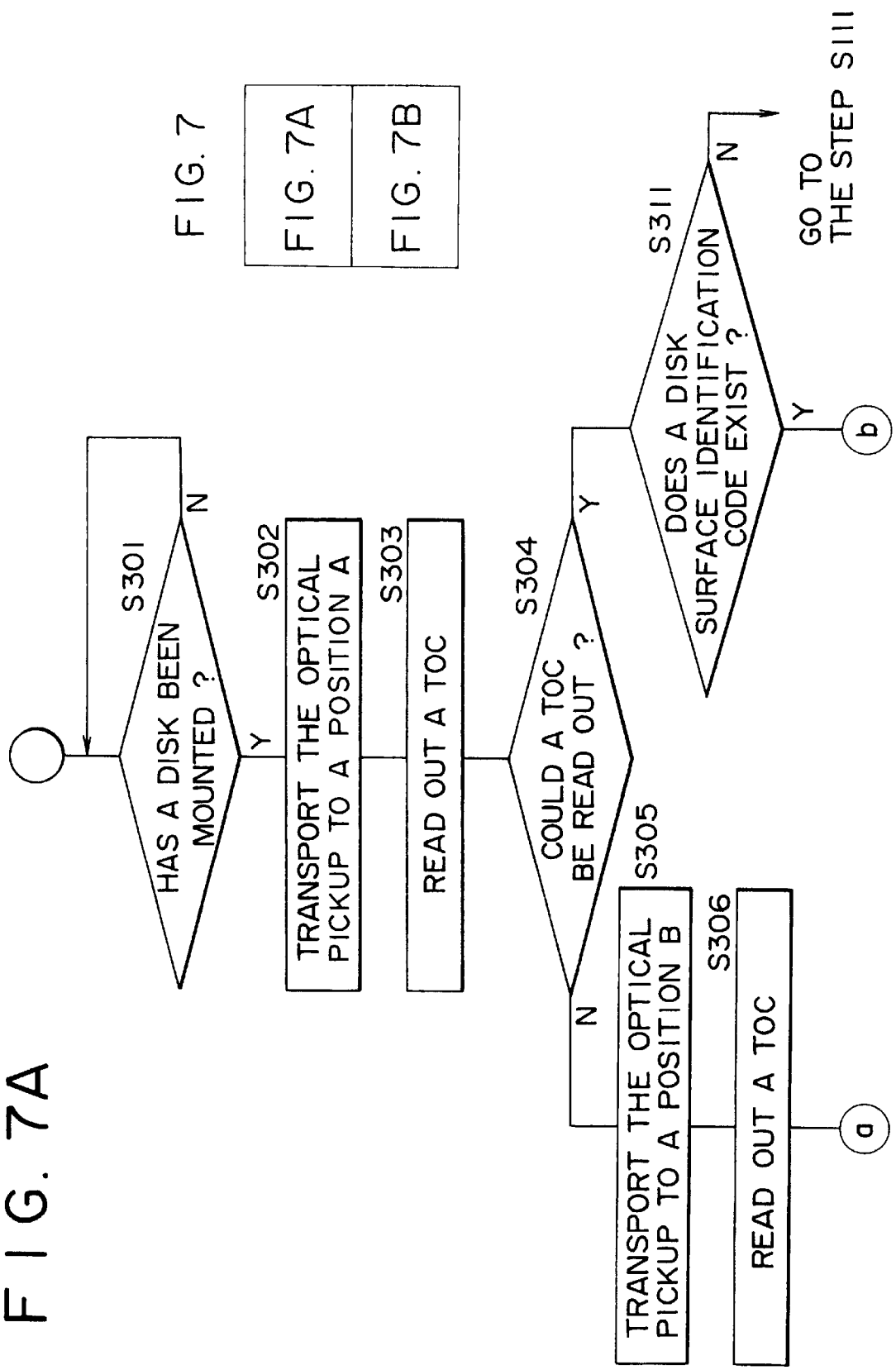

FIG. 8

| | | DISK SURFACE IDENTIFICATION CODE | |
|---|---|---|---|
| | | FIRST BIT | SECOND BIT |
| DOUBLE SIDED DISK | FRONT SURFACE | 1 | 1 |
| | BACK SURFACE | 1 | 0 |
| SINGLE SIDED DISK | | 0 | X (DON'T CARE) |

OPTICAL DISK PLAYER CAPABLE OF PLAYING BACK A PLURALITY OF DIFFERENT TYPE OPTICAL DISKS

BACKGROUND OF THE INVENTION

In general, the present invention relates to a disk playback apparatus for reproducing a video/audio signal from a disk. More particularly, the present invention relates to a disk playback apparatus having a playback function for reproducing a video/audio signal from a double sided disk, that is, a disk which allows a video/audio signal to be reproduced from both surface thereof.

In addition to the single sided optical disk such as a laser disk and a DVD (Digital Versatile Disk) wherein a signal is recorded only on one surface of the disk, there is also available a double sided disk which is made by sticking two recording surfaces to each other so as to allow a video/audio signal to be recorded on the two surfaces. As is generally known, for example, a disk playback apparatus such as laser disk playback apparatus is provided with a two-surface playback function allowing a convenient playback operation to be carried out by the user on such a double sided disk. With a disk playback apparatus having such a two-surface playback function, a video/audio signal can be reproduced from both the surfaces of a double sided disk without the need for the user to severally turn the disk the other way and remount it on the playback apparatus.

By the way, in a disk playback apparatus with such a two-surface playback function, the two surfaces are univocally defined as a normal playback surface or the so-called A surface and an opposite playback surface or the :so-called B surface. When the user would like to reproduce a video/audio signal recorded on a double sided disk from the beginning but the disk is incorrectly mounted on the tray of a disk playback apparatus so that a video/audio signal will be reproduced starting from the opposite playback surface, for example, reproduction of a video/audio signal starting from the head of the disk is impossible. If the disk is mounted incorrectly so that a video/audio signal will be reproduced starting from the opposite playback surface as such, the user must carry out an operation to start a playback operation from the normal playback surface, that is, the surface opposite to the opposite playback surface of the disk. In addition, if a single sided disk is mounted incorrectly so that a video/audio signal will be reproduced starting from the non-recording surface, the user must also carry out an operation to start a playback operation from the normal playback surface, that is, the surface opposite to the non-recording surface of the disk.

SUMMARY OF THE INVENTION

In order to solve the problems described above, it is thus an object of the present invention to provide a disk playback apparatus having a more complete function for always starting a playback operation from the surface of a mounted disk defined as the front surface thereof without regard to which surface of the disk mounted on the disk playback apparatus is facing the optical head of the disk playback apparatus.

To put it more concretely, addressing the problems described above, it is an object of the present invention to provide a disk playback apparatus comprising:

an optical head capable of radiating a light beam to a disk mounted on said disk playback apparatus;

a transport mechanism capable of transporting said optical head so as to expose said optical head to the front surface or the back surface of said disk;

a control information reading/judging means which is used for forming a judgment as to whether or not control information recorded on a predetermined area of said disk can be reproduced by said optical head (and used for reading out said control information from said predetermined area if said control information is found reproducible);

a control information substance judging means which is used for forming a judgment based on said control information read out by said control information reading/judging means as to whether said control information has been read out from said predetermined area on said front surface or said back surface of said disk in case an outcome of said judgment formed by said control information reading/judging means indicates that said control information can be reproduced by said optical head; and a transport control means which is used for controlling said transport mechanism to transport said optical head to a position on the other surface of said disk in case said outcome of said judgment formed by said control information reading/judging means indicates that said control information recorded on said predetermined area can not be reproduced by said optical head, and used for controlling said transport mechanism to transport said optical head to a position on said front surface of said disk in case an outcome of said judgment formed by said control information substance judging means indicates that said control information has been read out from said predetermined area on the back surface of said disk.

In addition, it is another object of the present invention to provide a disk playback method to be adopted in a disk playback apparatus comprising:

an optical head capable of radiating a light beam to a disk mounted on said disk playback apparatus; and a transport mechanism capable of transporting said optical head so as to expose said optical head to the front surface or the back surface of said disk, said disk playback method comprising:

a control information reading/reproducibility judging step at which a judgment as to whether or not control information recorded on a predetermined area of said disk can be reproduced by said optical head is formed (and said control information is read out from said predetermined area if said control information is found reproducible);

a front/back surface judging step of forming a judgment based on said control information read out at said reproducibility judging step as to whether said control information has been read out from said predetermined area on said front surface or said back surface of said disk in case an outcome of said judgment formed at said reproducibility judging step indicates that said control information can be reproduced by said optical head;

an other surface transportation step of controlling said transport mechanism to transport said optical head to a position on the other surface of said disk in case said outcome of said judgment formed at said reproducibility judging step indicates that said control information recorded on said predetermined area can not be reproduced by said optical head; and a front surface transportation step of controlling said transport mechanism to transport said optical head to a position on said front surface of said disk in case an outcome of said judgment formed at said front/back surface judging step indicates that said control information has been read out from said predetermined area on said back surface of said disk.

BRIEF DESCRIPTION OF THE DRAWINGS

Embodiments of the present invention will be described with reference to the following diagrams wherein:

FIG. 4 is a table showing types of disk to which the present invention is applied;

FIG. 5 shows a flowchart representing processing which is carried out at the time a disk is mounted on the disk playback apparatus implemented by the first embodiment of the present invention;

FIG. 6 shows a flowchart representing processing which is carried out at the time a disk is mounted on the disk playback apparatus implemented by the second embodiment of the present invention;

FIG. 8 is a table showing values of a descriptor for identifying a variety of disks.

DETAILED DESCRIPTION OF THE PREFERRED EMBODIMENTS

Figure 1:
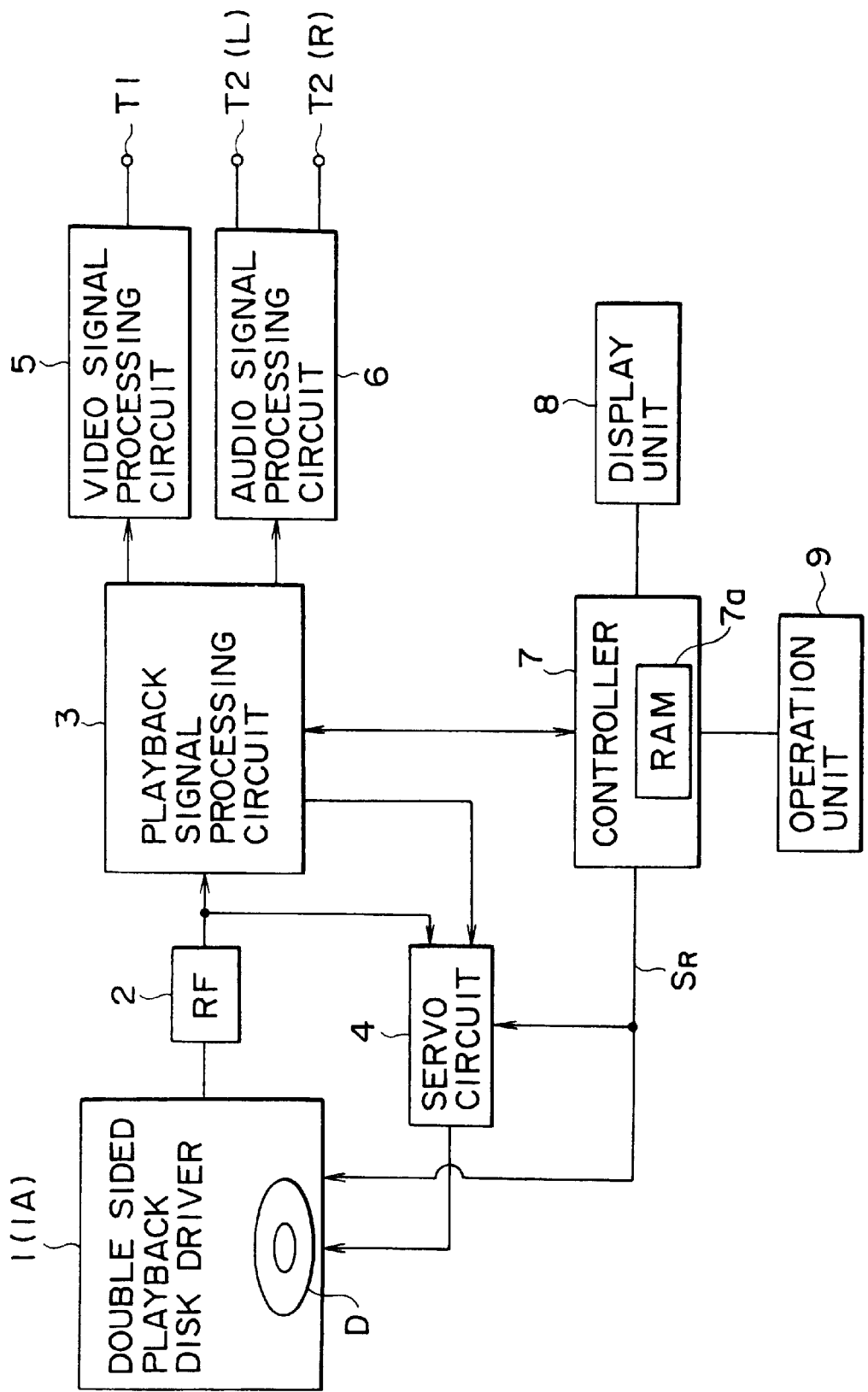
FIG. 1 is a block diagram showing a disk playback apparatus to which the present invention is applied.

The present invention will become more apparent from the following detailed description of some preferred embodiments implementing disk playback apparatuses with reference to FIGS. 1 to 8. The disk playback apparatus provided by the embodiments of the present invention are each a playback apparatus which is capable of reproducing video and audio signals from a disk and outputting the signals. The description is given in the following order:
1 Configuration of the Disk Playback Apparatus
2 Typical Configurations of the Double Sided Playback Disk Driver
2-1 First Typical Configuration
2-2 Second Typical Configuration
3 Types of Disk Handled by Disk Playback Apparatuses Implemented by the Embodiments
4 Processing Operations
4-a Processing Operations of the First Embodiment
4-b Processing Operations of the Second Embodiment
4-c Processing Operations of the Third Embodiment
1 Configuration of the Disk Playback Apparatus FIG. 1 is a block diagram showing the configuration of principal components composing each of disk playback apparatuses implemented by embodiments of the present invention in a simple and plain manner.

A double sided playback disk driver 1 (1A) shown in the figure is provided with an optical pickup (or an optical head) which is capable of reading out recorded information from various kinds of disk allowing information recorded therein to be reproduced by the optical pickup of the double sided playback disk driver 1 adapted to the disks. The optical pickup composes a head mechanism capable of reproducing a video/audio signal from the two surfaces of a disk D. It should be noted that an example of an actual configuration of the double sided playback disk driver 1 will be described later.

In the optical pickup employed in the double sided playback disk driver 1, a reflected light of a laser beam radiated to the disk D by the optical pickup is detected and converted into a photo-electric current by a photo detector in a photo-electrical conversion process. The photo-electric current resulting from the photo-electrical conversion process is then output to an RF matrix amplifier 2 as a playback signal.

In the RF matrix amplifier 2, the photo-electric current supplied thereto by the double sided playback disk driver 1 is converted into a voltage prior to amplification and other kinds of processing in order to generate a variety of signals. In the case of the embodiments provided by the present invention, the RF matrix amplifier 2 is capable of generating outputs such as a playback RF signal, a focus error signal and a tracking error signal. The signals output by the RF matrix amplifier 2 are then supplied to a playback signal processing circuit 3 and a servo circuit 4.

In the playback signal processing circuit 3, the playback signal supplied thereto by the RF matrix amplifier 2 undergoes, among other pieces of necessary processing, for example demodulation for converting the signal which was modulated to a form appropriate for disk recording into video/audio data with a predetermined format. In this case, the playback signal processing circuit 3 splits the playback signal into video data and audio data and supplies the video data to a video signal processing circuit 5 and the audio data to an audio signal processing circuit 6. In addition, data such as sub-codes, addresses and information on the rotational speed are extracted from the playback signal supplied to the playback signal processing circuit 3 by the RF matrix amplifier 2. The playback signal processing circuit 3 then outputs the data to a controller 7 and the servo circuit 4. It should be noted that, in an operation to play back a video/audio signal from a disk provided by the embodiment, a laser disk and other kinds of disk, a spindle error signal can also be generated typically from a horizontal synchronization signal of the reproduced video signal. However, the generation of the spindle error signal is neither described in detail nor shown in a figure.

In the video signal processing circuit 5, necessary signal processing is carried out on the video data supplied thereto to restore the data to the original video signal which is then output to a terminal T1. By the same token, in the audio signal processing circuit 6, necessary signal processing is carried out on the audio data supplied thereto to restore the data to the original stereo audio signals of the left and right channels which are then output to a left terminal T2 (L) and a right terminal T2 (R) respectively.

The video and audio data may each be compressed data having a predetermined format. In this case, the video signal processing circuit 5 and the audio signal processing circuit 6 carries out decompression of the compressed formats on the video and audio data respectively.

The servo circuit 4 generates a variety of servo drive signals such as focus, tracking, thread and spindle signals from the focus error signal and the tracking error signal supplied thereto by the RF matrix amplifier 2 as well as the spindle error signal and the data such as sub-codes, addresses and information on the rotational speed supplied thereto by the playback signal processing circuit 3. The servo drive signals are used for executing servo operations in the processing to reproduce a video spaudio signal from the disk carried out by the double sided playback disk driver 1.

Having a configuration including a microcomputer and a RAM unit 7a, the controller 7 is used for controlling a variety of operations carried out by the disk playback apparatus. Adapted to the two-surface playback function, the controller 7 is capable of outputting a playback surface switching control signal $S_R$ to the double sided playback disk driver 1 or the servo circuit 4 to request the double sided playback disk driver 1 or the servo circuit 4 to switch from the front surface of the disk to the back surface thereof or vice versa. It should be noted, that in the embodiments, the RAM unit 7a is provided with a storage area for storing a table of contents, that is, a sort of information read out from the disk. In addition, the RAM unit 7a also includes a storage area for storing the program number of a last program among programs recorded in a disk of an immediately previous playback operation.

Controlled by the controller 7, a display unit 8 is used for displaying information indicating an operating state of the disk playback apparatus. An operation unit 9 is provided with, among other components, a variety of operation keys each used by the user for carrying out an operation on the disk playback apparatus. To put it in detail, when the user operates an operation key, operation information corresponding to the operation key is transmitted to the controller 7.

Figure 2:
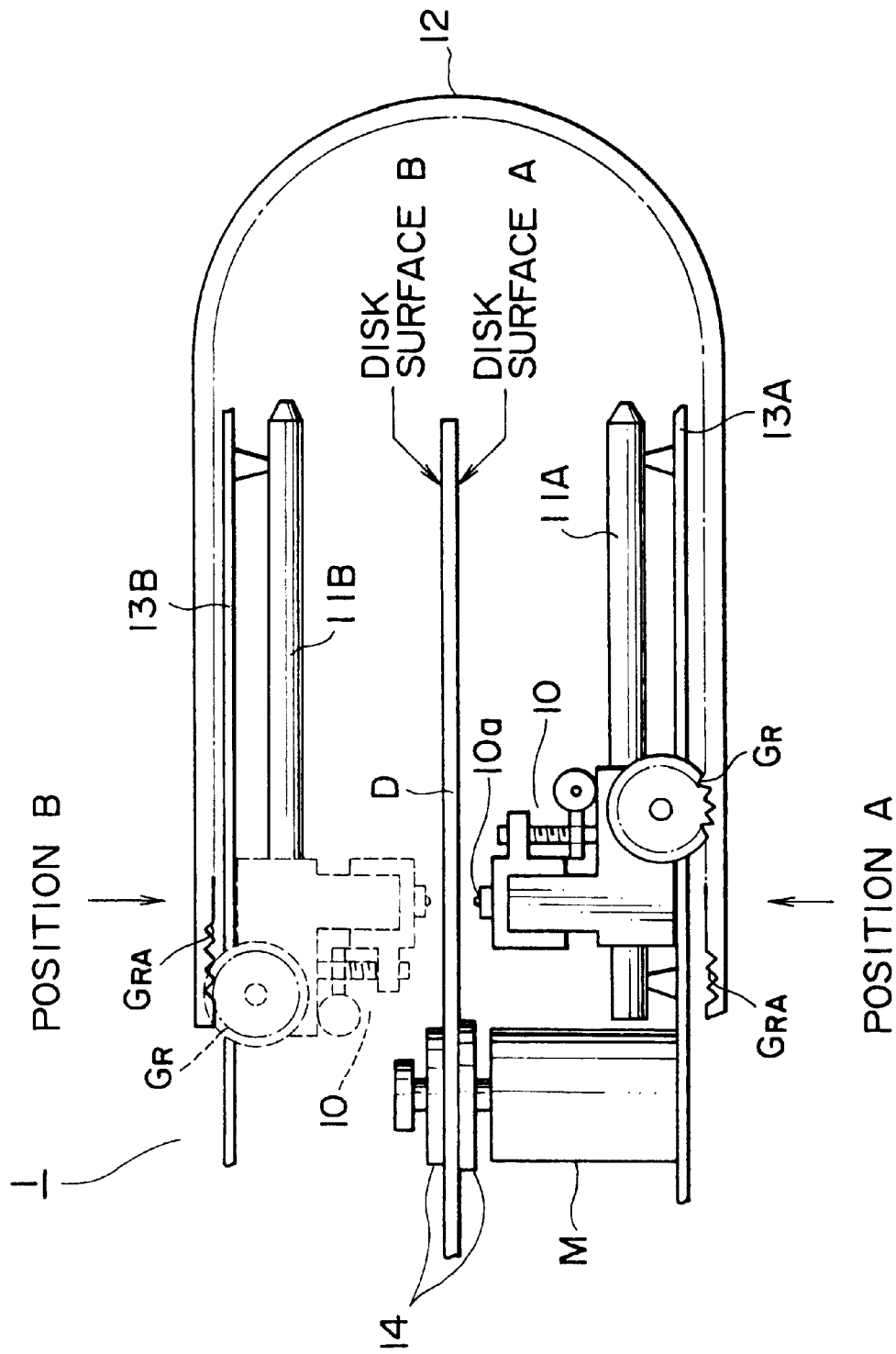
FIG. 2 is a diagram showing the mechanism of the disk playback apparatus capable of reproducing a video/audio signal from both the surfaces of a double sided disk as implemented by a first embodiment of the present invention.

2 Typical configurations of the Double Sided Playback Disk Driver 2-1 First Typical Configuration FIG. 2 is a diagram showing components composing the mechanism of the disk double sided playback disk driver 1 capable of reproducing a video/audio signal from both the surfaces of a double sided disk as implemented by a first embodiment of the present invention.

In the mechanism shown in the figure, a mounted disk D is put in a chucked state by a chucking mechanism 14. In this state, the disk D is driven by a spindle motor M into rotation.

It should be noted that, in the present specification, with regard to a disk put in a chucked state as shown in FIG. 2, a surface of the disk facing in the downward direction of the figure is defined as the surface A of the disk. On the other hand, a surface of the disk facing in the upward direction of the figure is defined as the surface B of the disk.

In the mechanism, only one optical pickup 10 is provided. The optical pickup 10 comprises an object lens 10a, a laser diode as well as a photo detector. It should be noted that the laser diode and the photo detector themselves are not shown in the figure. The optical pickup 10 detects a reflected light of a laser beam radiated to the disk D by the optical pickup 10 and converts the detected light into a photo-electric current which is output as a playback signal.

In the state shown in the figure, the optical pickup 10 is supported by a thread shaft 11A on the A surface side of the disk D in such a way that the optical pickup 10 can be moved thereby in the radial direction of the disk D, being capable of reading out a signal recorded on the surface A of the disk D. It should be noted that the thread shaft 11A is firmly supported by a thread shaft supporting unit 13A.

A transport rail 12 is provided to transport the optical pickup 10 from a position on the A surface side of the disk D to a position on the B surface side of the disk D and vice versa. In order to facilitate the transport of the optical pickup 10 between positions on the two sides, the optical pickup 10 is provided with a gear $G_R$ which is put in an engaged state with a transport gear $G_R$ provided on the transport rail 12. When the gear $G_R$ and the transport gear $G_{RA}$ are rotated by a necessary rotational distance along the transport rail 12, the optical pickup 10 is transported from a position on the A surface side of the disk D to a position on the B surface side of the disk D or vice versa.

With the optical pickup 10 transported to a position on the B surface side of the disk D from a position on the A surface side of the disk D as shown by a dashed line in the figure, the optical pickup 10 is supported by a thread shaft 11B in such a way that the optical pickup 10 can be moved thereby in the radial direction of the disk D, being capable of reading out a signal recorded on the surface B of the disk D as the optical pickup 10 is capable of reading out a signal recorded on the surface A of the disk D. By the same token, the thread shaft 11B is firmly supported by a thread shaft supporting unit 13B.

As described above, the first example of the configuration of the double sided playback disk drive 1 has a configuration wherein one optical pickup 10 is transported from a position on the A surface side of the disk D to a position on the B surface side of the disk D and vice versa, that is, a configuration adapted to the two-surface playback function.

2-2 Second Typical Configuration

Figure 3:
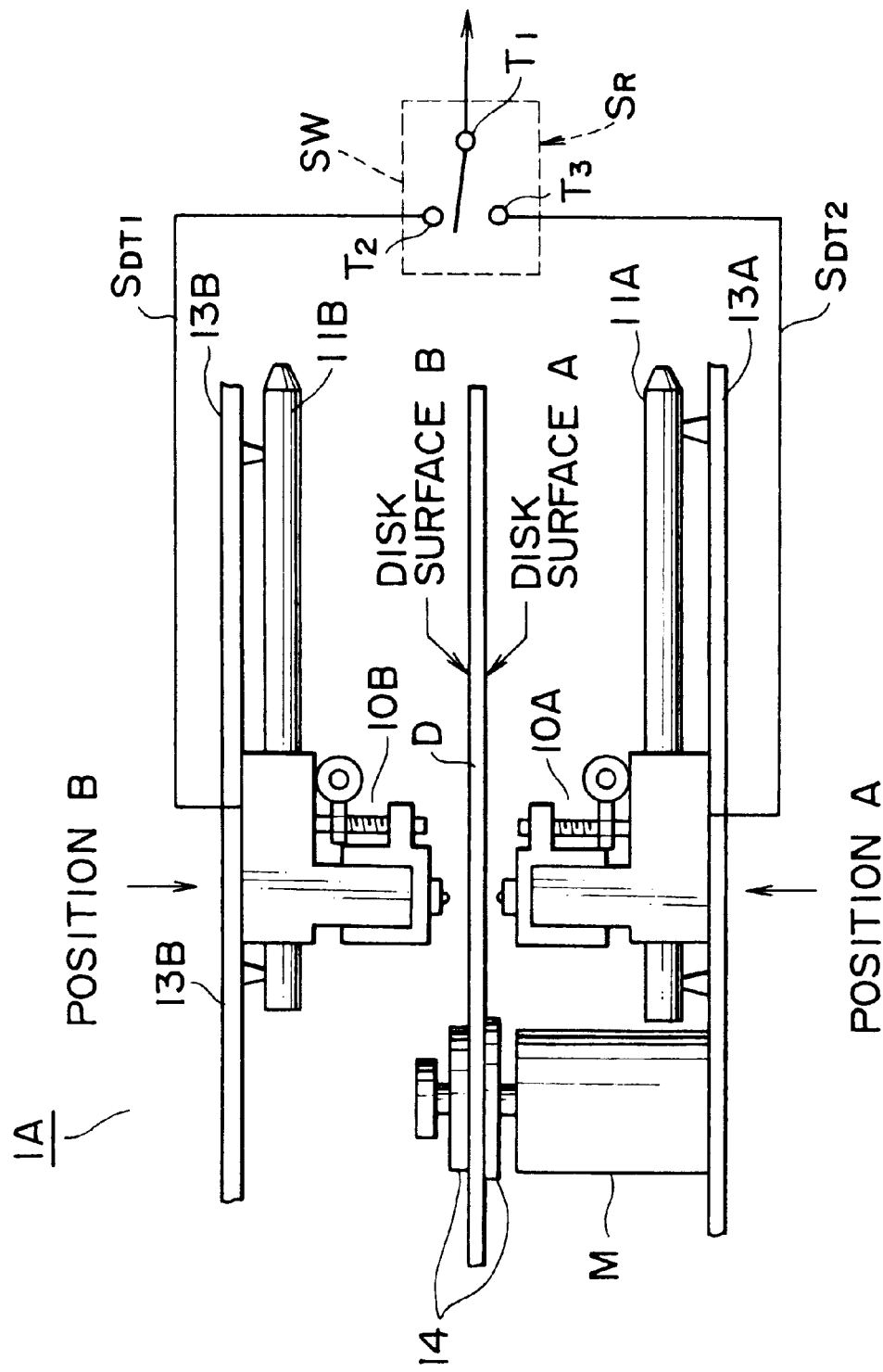
FIG. 3 is a diagram showing the mechanism of the disk playback apparatus capable of reproducing a video/audio signal from both the surfaces of a double sided disk as implemented by a second embodiment of the present invention.

FIG. 3 is a diagram showing a side view of a double sided playback disk driver 1A capable of reproducing a video/audio signal from both the surfaces of a double sided disk as implemented by a second embodiment of the present invention. Components identical with those employed in the first embodiment shown in FIG. 2 are denoted by the same reference numerals as the latter and explanation of the identical components is omitted.

In the case of the second embodiment, however, a first optical pickup 10A and a second optical pickup 10B are provided independently of each other on the A surface side and the B surface side of the disk D respectively in place of the single optical pickup 10 employed in the first embodiment. The first optical pickup 10A is supported by a thread shaft 11A on the A surface side of the disk D in such a way that the first optical pickup 10A can be moved thereby in the radial direction of the disk D, being capable of reading out a signal recorded on the surface A of the disk D. By the same token, the second optical pickup 10B is supported by a thread shaft 11B on the B surface side of the disk D in such a way that the second optical pickup 10B can be moved thereby in the radial direction of the disk D, being capable of reading out a signal recorded on the surface B of the disk D. In this arrangement, the first and second optical pickups 10A and 10B can have structures identical with each other.

A playback signal $S_{DT1}$ output by the first optical pickup 10A and a playback signal $S_{DT2}$ output by the second optical pickup 10B are supplied to input terminals T2 and T3 of a switch SW respectively.

The output terminal T1 of the switch SW is connected to either the input terminal T2 or T3 in accordance with the playback surface switching control signal SR in order to selectively pass on either the playback signal $S_{DT1}$, generated by the first optical pickup 10A or the playback signal $S_{DT2}$ generated by the second optical pickup 10B to a circuit connected to the output terminal T1 of the switch SW at a stage following the switch SW.

It should be noted that, in the case of a disk playback apparatus for playing back video/audio signals from a plurality of predetermined disk kinds with recording formats different from each other such as a CD and a DVD, it may be necessary to provide head mechanisms with structures different from each other for the respective kinds of disk. In order to implement the two-surface playback function adapted to the predetermined kinds of disk for each kind of disk through exploration of such configurations, in the HJI, it is conceivable to provide a plurality of assemblies each composed of members of a head mechanism for the kinds of disk mounted in the configuration shown in FIG. 2 or 3.

3 Types of Disk Handled by Disk Playback Apparatuses Implemented by the Embodiments With regard to the types of disk that can be handled by the disk playback apparatuses implemented by the embodiments, disks are classified from a disk recording surface point of view into some defined categories shown in FIG. 4. As shown in the figure, disks are classified into four categories referred to as Type 1 to Type 4 respectively.

Type 1 is a category of truly single sided disks. A disk of Type 1 has only one of the surfaces thereof used for recording information such as moving pictures, an audio signal and data. No information is recorded on the other surface of the disk at all. Typically, the surface with no recorded information at all is used as a label surface on which label information such as the title of the disk is printed. The compact disk is known as an example of a truly single sided disk.

Type 2 is a category of single sided disks. A particular one of the surfaces of a disk pertaining to Type 2 is used for recording data to be enjoyed by the user. On the other surface, only video data described below is recorded with no audio data. Practically, information is reproduced only from the particular one of the surfaces. Examples of disks of Type 2 are the so-called single sided laser disk and the DVD. Video and audio data recorded on the particular one of the surfaces of a disk pertaining to Type 2 is reproduced to be enjoyed by the user. On the other surface of the disk, static picture data is recorded. The static picture data recorded on the other surface is typically a message for urging the user to replace the disk or to reproduce information from the opposite surface. That is to say, the other surface of the disk is not used for recording video or audio data to be played back and enjoyed by the user.

A single sided disk may be an independent piece of disk or a last one of two or more pieces of disk. For example, in order to record a movie, two pieces of disk may be required. Both the surfaces of the first disk are used for recording the early part of the movie and the rest of the movie is recorded only on one surface of the second disk. The movie is thus recorded on a total of three layers (or three surfaces of the two disks). In this case, the second disk, that is, the last one of the two disks, is used as a single sided disk of Type 2.

Type 3 is a category of double sided disks each having TOC (Table of Contents). Both the surfaces of a disk of Type 3 are used for recording information and a TOC, that is, control information of the disk, is recorded on a predetermined area of each of the surfaces. Examples of disks of Type 3 are the so-called double sided laser disk and the DVD.

Type 4 is a category of double sided disks each having no TOC. Both the surfaces of a disk of Type 3 are used for recording information but no TOC is recorded on a predetermined area of each of the surfaces. An example of a disk of Type 3 is the so-called double sided laser disk which is put in the market in early years.

In the present specification, the front and back surfaces of a disk are clearly defined in order to distinguish them from each other. The front surface of a truly single sided disk of Type 1 or a single sided disk of Type 2 is the surface for recording information put to practical use for the user. On the other hand, the front surface of a double sided disk of Type 3 or 4 is the surface for storing early part of information on tracks thereof. If the recorded information is programs in particular, the front surface is the surface for recording programs having smaller program numbers.

The back surface of a truly single sided disk of Type 1 is the surface with no information recorded thereon. The back surface of a single sided disk of Type 2 is the surface for static image information practically not utilized by the user. The back surface of a double sided disk of Type 3 or 4 is the surface for recording the continuation of the early part of the information recorded on the front surface thereof and, if the information is programs, the back surface is used for recording programs having greater program numbers.

4 Processing operations 4-a Processing Operations of the First Embodiment

The disk playback apparatus implemented by the first embodiment with a configuration described above has a front surface playback starting function which is capable of starting a playback operation from the front surface of a disk of at least Type 1, Type 2 or Type 3, that is, at least a truly single sided disk, a single sided disk or a double sided disk with TOCs, without regard to which surface of the disk mounted on the disk playback apparatus is facing the optical head of the disk playback apparatus.

Processing operations carried out by the first embodiment for implementing the front surface playback starting function is described by referring to a flowchart shown in FIG. 5. The processing operations provided by the first embodiment can thus be applied to a double sided playback disk driver 1 with a head mechanism shown in FIG. 2. It should be noted that the execution of the processing operations represented by the flowchart shown in FIG. 5 is controlled by the controller 7.

As shown in the figure, the flowchart begins with a step S101 to wait for a disk D to be mounted by forming a judgment as to whether or not a disk D has been mounted. If the outcome of the judgment formed at the step S101 indicates that a disk D has been mounted, the flow of processing goes, on to a step S102. It should be noted that, in the present embodiment, the disk playback apparatus is set so that a playback operation is started automatically at the time a disk D is mounted on the disk playback apparatus.

At the step S102, control is executed to transport the optical pickup 10 employed in the double sided playback disk driver 1 to a position A on the A surface side of the disk D shown in FIG. 2. Control to transport the optical pickup 10 along the transport rail 12 to the opposite B surface side of the disk B is executed typically when the playback surface switching control signal SR is output by the controller 7 to the double sided playback disk driver 1. Thereafter, servo control to make an access to the position A is also executed by the controller 7.

The position A coincides with the head of a TOC area on an inner circumference on the surface A of the disk D for recording a TOC. By the same token, a position B to be described later coincides with the head of another TOC area on an inner circumference on the surface B of the disk D also for recording the TOC.

The flow of processing then proceeds to a step S103 at which processing to read out the TOC recorded on the surface A of the disk D by means of the optical pickup 10 is carried out. It should be noted that, in case the TOC can be read out at this processing step, the TOC is stored in a predetermined area in the RAM unit 7a employed in the controller 7.

Then, the flow of processing continues to a step S104 at which the controller 7 forms a judgment as to whether or not the TOC could be read out in the processing carried out at the step S103, that is, a judgment as to whether or not a TOC is recorded on the surface A of the disk D. If the outcome of the judgment formed at the step S104 indicates that the TOC could not be read out in the processing carried out at the step S103, the flow of processing goes on to a step S105. If the outcome of the judgment formed at the step S104 indicates that the TOC could be read out in the processing carried out at the step S103, on the other hand, the flow of processing goes on to a step S111.

An outcome of the judgment formed at the step S104, which indicates that the TOC could not be read out in the processing carried out at the step S103, causing the flow of processing to go on to the step S105, implies that the disk D mounted on the double sided playback disk driver 1 is a truly single sided disk of Type 1, a single sided disk of Type 2 or a double sided disk with no TOC of Type 4.

Therefore, at the step S105, control processing for transporting the optical pickup 10 to the position B on the B surface side of the disk D is carried out in order to verify the surface B of the disk D. The flow of processing then proceeds to a step S106 at which processing to read out the TOC recorded on the surface B of the disk D by means of the optical pickup 10 is carried out.

Then, the flow of processing continues to a step S107 at which the controller 7 forms a judgment as to whether or not the TOC could be actually read out in the processing carried out at the step S106.

If the outcome of the judgment formed at the step S107 indicates that the TOC could be read out in the processing carried out at the step S106, the flow of processing goes on to a step S118 at which playback processing is carried out. An outcome of the judgment formed at the step S107, which indicates that the TOC could be read out in the processing carried out at the step S106, causing the flow of processing to go on to the step S118, implies that the disk D mounted on the double sided playback disk driver 1 is a truly single sided disk of Type 1 or a single sided disk of Type 2. In this case, the front surface of the disk D is used as the surface B that is, the surface of the disk D placed on the B surface side. Normally, the user mounts the disk D in such a surface orientation that the label of the disk D indicating the front surface thereof faces downward, that is, the front surface of the disk D is used as the surface A.

If the outcome of the judgment formed at the step S107 indicates that the TOC could not be read out in the processing carried out at the step S106, on the other hand, the flow of processing goes on to a step S108 at which an attempt to read out video or audio data from the disk D is made anyway. The flow of processing then goes on to a step S109 to form a judgment as to whether or not data could be read out at the step S108.

If the outcome of the judgment formed at the step S109 indicates that data could be read out in the processing carried out at the step S108, the flow of processing goes on to the step S118 at which playback processing is carried out. The flow of processing from the step S109 to the step S118 indicates that the disk D mounted on the double sided playback disk driver 1 is a double sided disk with no TOC of Type 4. In this case, it is possible to start the processing to reproduce information at least from either the front or back surface of the double sided disk with no TOC of Type 4.

If the outcome of the judgment formed at the step S109 indicates that data could not be read out in the processing carried out at the step S108, on the other hand, the flow of processing goes on to the step S110 at which error handling processing is carried out before leaving this routine. As a conceivable error handling processing, a message is typically output to the display unit 8 to notify the user that the format of the disk D mounted on the double sided playback disk driver 1 is not compatible with the disk playback apparatus implemented by the embodiment.

The flow of processing from the step S104 to the step S111 indicates that the disk D mounted on the double sided playback disk driver 1 is a truly single sided disk of Type 1, a single sided disk of Type 2 or a double sided disk having TOCs of Type 3. In the case of a disk D of Type 1 or Type 2, the disk D is mounted on the double sided playback disk driver 1 in such a surface orientation that the front surface of the disk D is used as the surface A.

At the step S111, the controller 7 forms a judgment based on the contents of the TOC read out from the TOC area of the surface A of the disk D as to whether or not the program number of a head program recorded on the surface A indicates Track 1 for recording the head program. A YES outcome of the judgment formed at the step S111 indicates that the current surface A is the front surface of the disk D. In this case, the flow of processing goes on to the step S118 at which playback processing of information is carried out for the surface A of the disk D with no further verification. The flow of processing from the step S111 to the step 118 indicates that the mounted disk D is a truly single sided disk of Type 1 mounted on the double sided playback disk driver 1 with the front surface thereof placed on the A surface side, a single sided disk of Type 2 used as a last one of a set of disks mounted on the double sided playback disk driver 1 with the front surface thereof placed on the A surface side or a double sided disk having TOCs of Type 3 mounted on the double sided playback disk driver 1 with the front surface thereof placed on the A surface side.

If the judgment formed at the step S111 results in a NO outcome, on the other hand, the flow of processing goes on to a step S112 to form a judgment as to whether or not the program number of a head program recorded on the surface A of the disk D is the continuation of the program number of a last program recorded on a disk mounted in the immediately preceding playback operation. Information on the program number of a last program recorded on a disk mounted in the immediately preceding playback operation is included in the TOC of the disk which was read out from the TOC area thereof by the controller 7 and stored in the RAM unit 7a during the immediately preceding playback operation.

A YES outcome of the judgment formed at the step S112 infers that the presently mounted disk D is a continuation of the disk mounted in the immediately preceding playback operation and that information recorded on the surface A of the presently mounted disk D is a continuation of information reproduced last from the disk mounted in the immediately preceding playback operation. In this case, the flow of processing goes on to a step S118 at which playback processing is carried out on information recorded on the surface A of the disk D.

If the judgment formed at the step S112 results in a NO outcome, on the other hand, the flow of processing goes on to a step S113 at which the optical pickup 10 is transported to the position B on the B surface side. The flow of processing then proceeds to a step S114 to carry out processing to read out a TOC from the TOC area of the surface B of the disk D. Then, the flow of processing continues to a step S115 at which the controller 7 forms a judgment as to whether or not the TOC could be read out from the surface B of the disk D in the processing carried out at the step S114.

An outcome of the judgment formed at the step S115 indicating that no TOC could be read out in the processing carried out at the step S114 implies that, for example, the single sided disk D of Type 2 presently mounted on the double sided playback disk driver 1 is not a continuation of the disk mounted in the immediately preceding playback operation and the disk D is mounted so that the front surface thereof is placed on the B surface side. In such a case, the flow of processing goes on to a step S116 at which the optical pickup 10 is transported to a position on the A surface side. After control to make an access to a playback start position of information has been carried out at the step S116, the flow of processing proceeds to the step S118 at which playback processing is executed for information recorded on the surface of the disk D placed on the A surface side.

If the outcome of the judgment formed at the step S115 indicates that the TOC could be read out in the processing carried out at the step S114, on the other hand, the flow of processing continues to a step S117. The flow of processing from the step S115 to the step S117 indicates that the presently mounted disk D is a double sided disk having TOCs of Type 3 which is used as a second or subsequent one of a set of disks and the operations to read out the TOCs recorded on the surfaces of the disk D placed on the both A and B surface sides have been completed.

At the step S117, the controller 7 forms a judgment based on the contents of the TOCs recorded on both the surfaces of the disk D on the A and B surface sides as to whether or not the program number (a) of a head program on the surface A of the disk D is smaller than the program number (b) of a head program on the surface B of the disk D (a<b).

An outcome of the judgment formed at the step S117 indicating that the program number (a) is not smaller than the program number (b), that is, a≧b, implies that the surface of the disk D on the B surface side is the front surface. In this case, the flow of processing goes on to the step S118 at which playback processing is carried out on the information recorded on the surface placed on the B surface side without changing the position of the optical pickup 10. On the other hand, an outcome of the judgment formed at the step S117 indicating that the program number (a) is smaller than the program number (b), that is, a<b, implies that the surface of the disk D on the A surface side is the front surface. In this case, the flow of processing goes on to the step S116 at which the optical pickup 10 is transported to a position on the A surface side and control to make an access to the playback start position on the front surface is carried out. Then, the flow of processing proceeds to the step S118 at which playback processing is carried out on information recorded on the surface placed on the A surface side.

By carrying out processing operations described above, a playback operation can always be started from the front surface of a truly single sided disk of Type 1, a single sided disk of Type 2 or a double sided disk with TOCs of Type 3 without regard to which surface of the disk is placed on the A surface side when the disk is mounted on the double side playback driver 1 implemented by the embodiment for disks of Types 1 to 4 shown in FIG. 4.

4-b Processing Operations of the Second Embodiment

Next, processing operations carried out by the second embodiment to implement a front surface playback start function are explained by referring to a flowchart shown in FIG. 6. The processing operations provided by the second embodiment can thus be applied to a double sided playback disk driver 1A with a head mechanism shown in FIG. 3.

Processing operations carried out at steps S201 to S218 of the flowchart shown in the figure are similar to those of the steps S101 to S118 of the flowchart shown in FIG. 5, making it unnecessary to repeat the explanation of the similar steps.

It should be noted, however, that at the steps S202, S205 and S213, instead of transporting an optical pickup to a position on the opposite side of the disk D, optical pickup switching is carried out to activate an optical pickup provided on the opposite side of the disk D for reading out information recorded on the surface of the disk D placed on the opposite side. To put it in detail, at the step S202, after a switching operation to the first optical pickup 10A provided on the A surface side of the disk D has been carried out, the first optical pickup 10A is transported to a position A. At the steps S205 and S213, after a switching operation from the first optical pickup 10A to a second optical pickup 10B provided on the B surface side of the disk D has been carried out, the second optical pickup 10B is transported to a position B.

At a step S216, after a switching operation from the second optical pickup 10B to the first optical pickup 10A has been carried out, control to move the first optical pickup 10A to the playback start position of the disk D on the A surface side and to make an access thereto is executed.

The switching operations from the first optical pickup 10A to the second optical pickup 10B carried out at the steps S202, S205, S213 and S216 or vice versa are implemented by a switch SW shown in FIG. 3 which is controlled by the playback surface switching control signal $S_R$ generated by the controller 7.

4-c Processing Operations of the Third Embodiment

In the case of a disk having a TOC, the TOC normally includes a disk surface identification code recorded in a predetermined area in the TOC. In this case, it is possible to execute processing for implementing the front surface playback function in accordance with the value of the disk surface identification code.

The following is description of processing operations based on the value of the disk surface identification code for implementing the front surface playback function provided as a third embodiment.

In the present embodiment, the disk surface identification code is defined typically as shown in FIG. 8.

As shown in the figure, the disk surface identification code comprises two bits, that is, a first bit and a second bit. The first bit is a code for indicating whether the disk is double sided or single sided. To be more specific, a first bit of '1' indicates a double sided disk of Type 3 while a first bit of '0' indicates a single sided disk of either Type 1 or Type 2. The second bit is a code for indicating whether a surface of a double sided disk is the front or back surface. To be more specific, a second bit of '1' indicates that the surface is the front surface while a second bit of '0' indicates that the surface is the back surface. In the case of a single sided disk, the second bit is not used. The second bit of a single sided disk thus has a 'don't care (x)' value.

Therefore, in the case of a double sided disk of Type 3, the disk surface identification code of the TOC recorded on the front surface is '11' whereas the disk surface identification code of the TOC recorded on the back surface is '10'. In the case of a single sided disk of either Type 1 or Type 2, on the other hand, the disk surface identification code of the TOC recorded on the surface thereof is '0x'.

It should be noted that the definition of the disk surface identification code shown in the figure is typical to the end. In actuality, any definitions different from what is shown in the figure can be adopted.

Figure 7B:
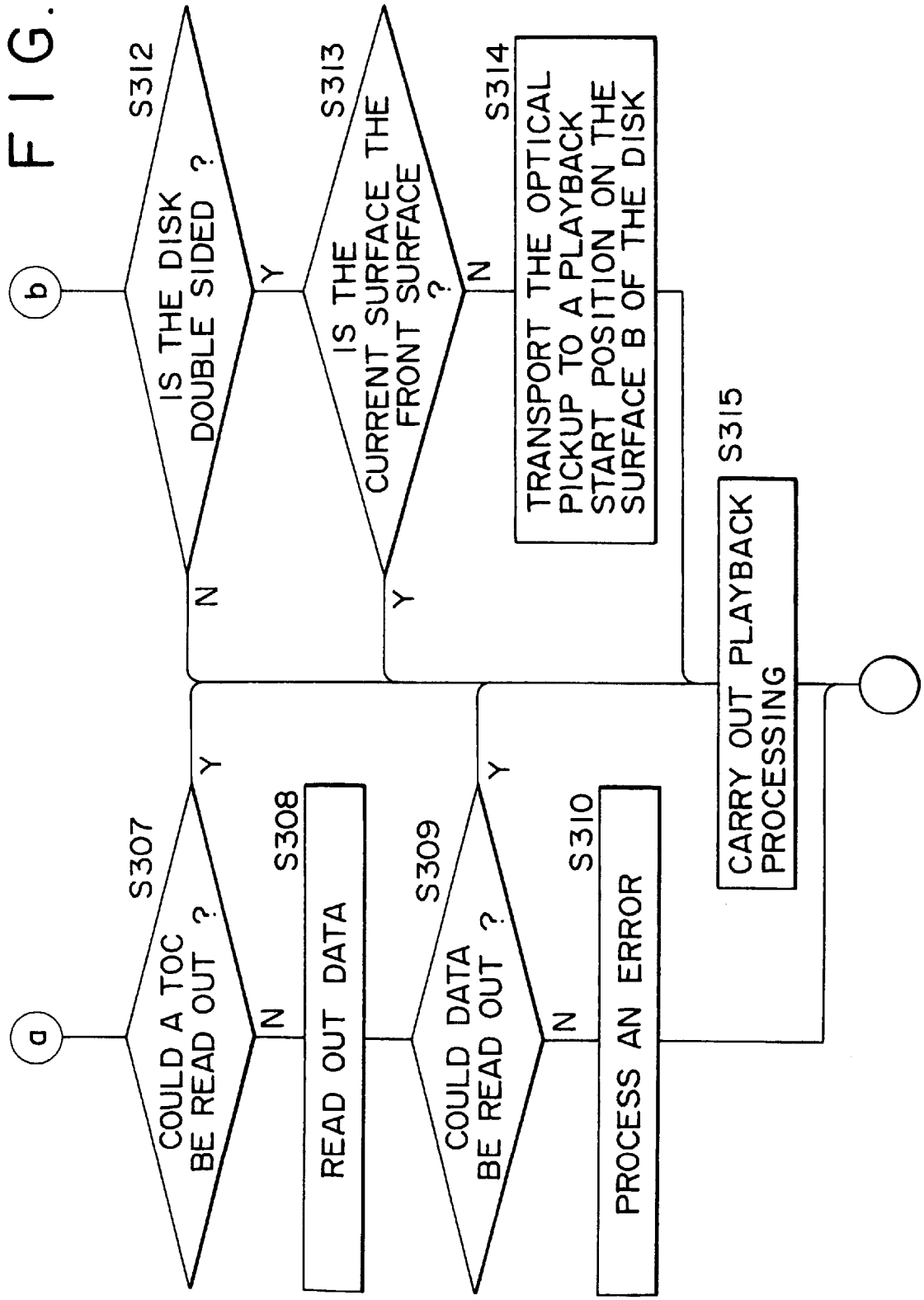
FIG. 7 shows a flowchart representing processing which is carried out at the time a disk is mounted on the disk playback apparatus implemented by a third embodiment of the present invention.

FIG. 7 shows a flowchart representing processing operations carried out by the controller 7 as implemented by the third embodiment. The flowchart is based on the assumption that the double sided playback disk driver 1 has a configuration provided with a head mechanism like the one shown in FIG. 2.

Processing operations carried out at steps S301 to S310 and a step S315 of the flowchart shown in the figure are similar to those of the steps S101 to S110 and the step S118 of the flowchart shown in FIG. 5 respectively, making it unnecessary to repeat the explanation of the similar steps.

If a judgment formed at the step S304 of the flowchart shown in FIG. 7 results in a YES outcome, the flow of processing goes on to a step S311 to form a judgment as to whether or not the TOC read out from the surface of the disk D on the A surface side has a disk surface identification code set therein. If the outcome of the judgment formed at the step S311 indicates that no disk surface identification code is set in the TOC, the flow of processing proceeds to the pieces of processing of the step S111 and the subsequent steps of the flowchart shown in FIG. 5 at which the front surface of the disk D is identified from information on the track number without resorting to a disk surface identification code. If the outcome of the judgment formed at the step S311 indicates that a disk surface identification code is set in the TOC, on the other hand, the flow of processing goes on to a step S312.

At the step S312, the controller 7 forms a judgment based on the value of the disk surface identification code defined typically as shown in FIG. 8 as to whether the presently mounted disk D is double sided or single sided. If the outcome of the judgment formed at the step S312 indicates that the disk D is single sided, the flow of processing goes on to a step S315 at which processing to reproduce information from the surface of the disk D placed on the A surface side is carried out without transporting the optical pickup 10 to the opposite side. If the outcome of the judgment formed at the step S312 indicates that the disk D is double sided, on the other hand, the flow of processing goes on to a step S313 to form a judgment based on the value of the disk surface identification code as to whether the surface of the disk D placed on the A surface side is the front or back surface. If the outcome of the judgment formed at the step S313 indicates that the surface of the disk D placed on the A surface side is the front surface, the flow of processing goes on to the step S315 at which processing to reproduce information from the surface of the disk D placed on the A surface side is carried out without transporting the optical pickup 10 to the opposite side. If the outcome of the judgment formed at the step S313 indicates that the surface of the disk D placed on the A surface side is the back surface, on the other hand, the flow of processing goes on to a step S314 at which control is executed to transport the optical pickup 10 to a playback start position on the B surface side of the disk D. The flow of processing then proceeds to the step S315 at which processing to reproduce information recorded on the surface of the disk D on the B surface side is started.

Being similar to the processing operations represented by the flowchart shown in FIG. 6, the processing operations provided by the third embodiment can also be applied to the double sided playback disk driver 1A with a configuration including a head mechanism like the one shown in FIG. 3.

As described above, in the processing operations provided by each of the first to third embodiments, a playback operation is started from the front surface of a disk without the need for the user to carry out a special playback operation at the completion of the mounting of the disk. It should be noted, however, that the embodiment can also be changed to a configuration wherein, after a disk has been mounted, an operation to merely move the optical pickup to a position on front surface side of the disk is needed and, then, a playback operation is started only if such an operation for a playback operation has been carried out.

In addition, the embodiments described above do not impose any limitation on the type of disk to be handled by the disk playback apparatus. In the present state of the art, nevertheless, it is possible to handle a category of disks to which double sided disks such as laser disks and DVDs belong. Besides the laser disk and the DVD, the present invention can also be suitably applied to the so-called compatible disk playback apparatus which is capable of reproducing video and audio signals from a plurality of disk categories including the CD.

On the top of that, the scope of the present invention also includes a disk playback apparatus which has, for example, a two-surface recording/playback function for keeping up with a writable double sided disk. The disk playback apparatus provided by the present invention can also have a configuration wherein, by referring to the contents of a TOC of a writable double sided disk, an access to a recording start position can be made automatically.

As described above, the present invention provides a disk playback apparatus having typically a two-surface playback function whereby, depending on whether or not control information is recorded on a disk and by referring to the substance of the control information, if recorded, the front surface of a single sided disk can be verified, allowing playback processing to be carried out starting with a surface of the disk regarded as the front surface thereof without regard to the surface orientation in which the disk is mounted on the disk playback apparatus. As a result, the two-surface playback function can be made more effective. In addition, according to the present invention, playback processing can always be started from the front surface of a disk regardless of whether the disk is single sided or double sided. For this reason, the present invention becomes more useful if applied to playback equipment such as a disk playback apparatus that is capable of reproducing video and audio signals from a plurality of disk categories such as the CD and a variety of video disks.

What is claimed is:

1. A disk playback apparatus comprising:

an optical head for radiating a light beam to a disk mounted on said disk playback apparatus;

a transport mechanism for transporting said optical head so as to expose said optical head to a front surface or a back surface of said disk;

control information reading and judging means for determining whether or not control information recorded in a predetermined area of said disk is reproducible by said optical head and for reading out said control information from said predetermined area if said control information is found reproducible;

control information substance judging means responsive to said control information read out by said control information reading and judging means for determining whether said control information has been read out from said predetermined area on said front surface or said back surface of said disk when said control information reading and judging means determines that said control information is reproducible by said optical head; and transport control means for controlling said transport mechanism to transport said optical head to a position from one of said surfaces to the other of said surfaces of said disk when said control information reading and judging means determines that said control information recorded on said predetermined area is not reproducible by said optical head, and for controlling said transport mechanism to transport said optical head to a position on said front surface of said disk when said control information substance judging means determines that said control information has been read out from said predetermined area on the back surface of said disk.

2. A disk playback apparatus according to claim 1 wherein:

said control information substance judging means includes program start number judging sub-means for determining whether or not a program start number on one surface of said disk matches a program start number included in said control information, and if not, said transport control means controls said transport mechanism to transport said optical head to a position on the other surface of said disk, and if so, said transport control means controls said transport mechanism to transport said optical head to a position corresponding to said program start number on said surface of said disk.

3. A disk playback apparatus according to claim 2 wherein, if said program start number on said surface of said disk does not match said program start number included in said control information, then after said transport control means has controlled said transport mechanism to transport said optical head to a position on said other surface of said disk, said control information substance judging means compares a program start number included in said control information read out from said one surface of said disk with a program start number included in said control information read out from said other surface of said disk to determine whether said one surface of said disk is the front surface of said disk and said other surface of said disk is the back surface of said disk or said one surface of said disk is said back surface of said disk and said other surface of said disk is said front surface of said disk, and said transport control means controls said transport mechanism to transport said optical head to a playback start position on the surface of said disk determined by said control information substance judging means to be said front surface of said disk.

4. A disk playback apparatus according to claim 1 further comprising storage means for storing the number of a last program of a disk that has last been played back, and wherein said control information substance judging means compares a program start number included in control information read out by said control information reading and judging means with the number of said last program stored in said storage means and said transport control means controls said transport mechanism to transport said optical head to a position for providing a continuation program start number of the number of said last program.

5. A disk playback apparatus according to claim 1 wherein said control information recorded in said predetermined area of a disk includes data used for identifying whether a surface of said disk including said predetermined area is the front or back surface of said disk and said control information substance judging means uses said surface-identifying data for at least determining whether a surface of said disk including said predetermined area is said front or back surface of said disk.

6. A disk playback method for use in a disk playback apparatus having an optical head for radiating a light beam to a disk mounted on said disk playback apparatus; and a transport mechanism for transporting said optical head so as to expose said optical head to a front surface or a back surface of said disk, said disk playback method comprising the steps of:

determining whether or not control information recorded on a predetermined area of said disk is reproducible by said optical head and reading out said control information from said predetermined area if said control information is determined to be reproducible;

using said read out control information to determine whether said control information has been read out from said predetermined area on said front surface or said back surface of said disk when it is determined that said control information is reproducible by said optical head;

controlling said transport mechanism to transport said optical head to a position from one of said surfaces to the other of said surfaces of said disk when it is determined that said control information recorded on said predetermined area is not reproducible by said optical head; and controlling said transport mechanism to transport said optical head to a position on said front surface of said disk when it is determined that said control information has been read out from said predetermined area on said back surface of said disk.

7. A disk playback method according to claim 6, further comprising the steps of determining whether or not a program start number on one surface of said desk matches a program start number included in said control information to transport said optical head to a position on the other surface of said disk, and if so, controlling said transport mechanism to transport said optical head to a position corresponding to said program start number on said surface of said disk.

8. A disk playback method according to claim 7 wherein if said program start number on said surface of said disk does not match said program start number included in said control information, then after said transport mechanism has transported said optical head to a position on said other surface of said disk, a program start number included in said control information read out from said one surface of said disk is compared with a program start number included in said control information read out from said other surface of said disk to determine whether said one surface of said disk is the front surface of said disk and said other surface of said disk is the back surface of said disk or whether said one surface of said disk is said back surface of said disk and said other surface of said disk is said front surface of said disk, and said transport mechanism is controlled to transport said optical head to a playback start position on the surface of said disk determined to be said front surface of said disk.

9. A disk playback method according to claim 6, further comprising the step of storing the number of a last program of a disk that has last been played back, and wherein a program start number included in said read out control information is compared with the stored number so that said transport mechanism is controlled to transport said optical head to a position for providing a continuation program start number of the number of said last program.

10. A disk playback method according to claim 6 wherein said control information recorded in said predetermined area of a disk includes data used for identifying whether a surface of said disk including said predetermined area is the front or back surface of said disk, and wherein said surface-identifying data is used for at least determining whether a surface of said disk including said predetermined area is said front or back surface of said disk.

* * * * *